(12) United States Patent
Salam et al.

(10) Patent No.: US 7,782,761 B2
(45) Date of Patent: Aug. 24, 2010

(54) ETHERNET CONNECTIVITY FAULT MANAGEMENT (CFM) AREA BOUNDARY TRANSLATOR

(75) Inventors: Samer M. Salam, Vancouver (CA); Viet Nguyen, San Jose, CA (US)

(73) Assignee: Cisco Technology, Inc, San Jose, CA (US)

( * ) Notice: Subject to any disclaimer, the term of this patent is extended or adjusted under 35 U.S.C. 154(b) by 162 days.

(21) Appl. No.: 12/045,563

(22) Filed: Mar. 10, 2008

(65) Prior Publication Data

US 2009/0225661 A1 Sep. 10, 2009

(51) Int. Cl.
*G06F 11/00* (2006.01)
*G06F 15/173* (2006.01)
*H04L 12/56* (2006.01)

(52) U.S. Cl. ...................... 370/216; 370/242; 370/392; 709/238

(58) Field of Classification Search ......... 370/216–392, 370/401, 402; 709/238; 714/43
See application file for complete search history.

(56) References Cited

U.S. PATENT DOCUMENTS

| | | | |
|---|---|---|---|
| 2006/0056414 A1* | 3/2006 | Elie-Dit-Cosaque et al. | 370/392 |
| 2006/0159008 A1* | 7/2006 | Sridhar et al. | 370/216 |
| 2008/0016402 A1* | 1/2008 | Harel et al. | 714/43 |
| 2009/0113070 A1* | 4/2009 | Mehta et al. | 709/238 |

OTHER PUBLICATIONS

"Ethernet Operations, Administration, and Maintenance," Cisco Systems, Inc. San Jose, CA, 2007, 15 pages.
"Virtual Bridged Local Area Networks—Amendment 5: Connectivity Fault Management," IEEE P802.1ag/D8.1, Institute of Electrical and Electronics Engineers, New York, New York, Jun. 18, 2007, 255 pages.
Nordmark, "Stateless IP/ICMP Translation Algorithm (SIIT)," RFC 2765, The Internet Society, Feb. 2000, 26 pages.
"Series Y: Global Information Infrastructure, Internet Protocol Aspects and Next-Generation Networks," ITU-T Y.1731, International Telecommunications Union, May 2006, 80 pages.

* cited by examiner

*Primary Examiner*—Afsar M. Qureshi
(74) *Attorney, Agent, or Firm*—The Law Office of Kirk D. Williams

(57) ABSTRACT

An Ethernet Connectivity Fault Management (CFM) Area Boundary Translator is configured to translate incompatible CFM messages being sent between networks operating according to different CFM versions which are not fully compatible. Such translation may include the Ethernet CFM area boundary translator acts as a proxy in forwarding translated the CFM messages.

20 Claims, 5 Drawing Sheets

ETHERNET CONNECTIVITY FAULT MANAGEMENT (CFM) AREA BOUNDARY TRANSLATOR

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public communications networks are being built and expanded using various packet technologies, including Ethernet technology for metropolitan-area networks (MANs) and wide-area networks (WANs). An end-to-end bridged network used by an organization may span portions of the networks of multiple independent organizations (e.g., backbone carriers, access providers) as well as portions of its own networks. Each of these portions of the network may restrict management access to each other's equipment, which complicates operation, administration, and maintenance (OAM) of the end-to-end network.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1:
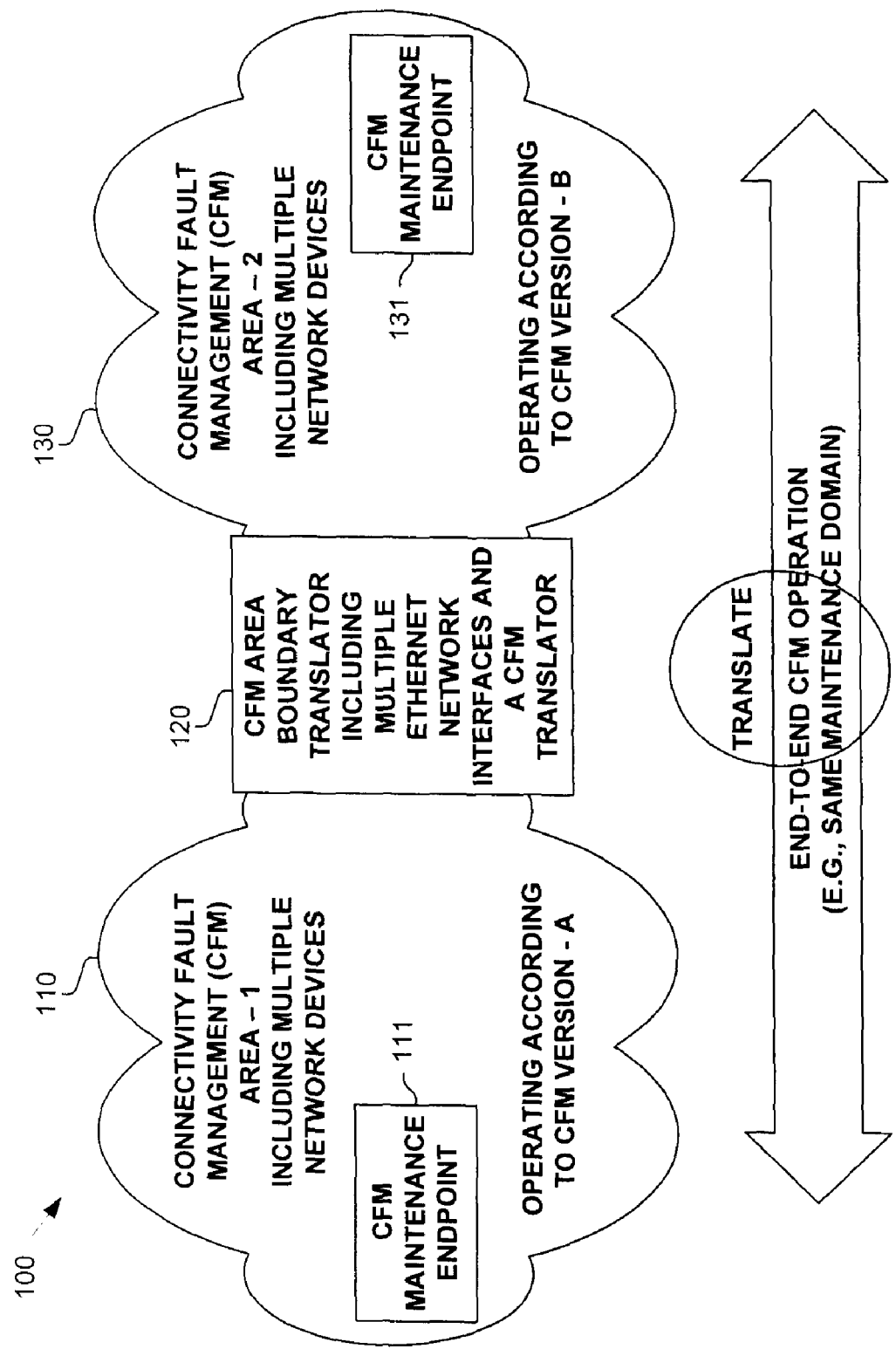
FIG. 1 illustrates a CFM area boundary translator in an example network operating according to one embodiment.

Disclosed are, inter alia, methods, apparatus, computer-storage media, mechanisms, and means associated with an Ethernet Connectivity Fault Management (CFM) area boundary translator. One embodiment of an Ethernet CFM area boundary translator includes multiple Ethernet network interfaces, including: a first network interface configured for communicating with a first CFM area, and a second network interface configured for communicating with a second CFM area. The first CFM area is operating according to a CFM version not fully compatible with a CFM version according to which the second CFM area is operating. A CFM translator component within the Ethernet CFM area boundary translator is configured to translate incompatible CFM messages communicated between the first and second CFM areas. In one embodiment, the Ethernet CFM area boundary translator acts as a proxy in forwarding translated CFM messages.

2. Description

Disclosed are, inter alia, methods, apparatus, computer-storage media, mechanisms, and means associated with an Ethernet Connectivity Fault Management (CFM) area boundary translator. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

IEEE 802.1AG Connectivity Fault Management (CFM) specifies certain operations, administration, and maintenance (OAM) capabilities across multiple administrative domains of an end-to-end network. Currently, CFM basically comprises three protocols that work together to help administrators debug Ethernet networks. These are: Continuity Check, Linktrace and Loopback protocols. Continuity Check basically refers to "heartbeat" messages issued periodically by maintenance endpoints. They allow maintenance endpoints to detect loss of service connectivity amongst themselves. They also allow maintenance endpoints to discover other maintenance endpoints within a domain, and allow maintenance intermediate points to discover maintenance endpoints. Linktrace messages are transmitted by a maintenance endpoint on the request of the administrator to track the path (hop-by-hop) to a destination maintenance point. They allow the transmitting node to discover vital connectivity data about the path. Linktrace is similar in concept to UDP Traceroute. Loopback messages are transmitted by a maintenance endpoint on the request of the administrator to verify connectivity to a particular maintenance point. Loopback indicates whether the destination is reachable or not; it does not allow hop-by-hop discovery of the path. It is similar in concept to ICMP Echo (Ping).

Ethernet CFM, within any given service provider network, relies on a functional model consisting of hierarchical maintenance domains. A maintenance domain is an administrative domain for the purpose of managing and administering a network. A domain is assigned a unique maintenance level (among eight possible) by the administrator, which is useful for defining the hierarchical relationship of domains. Maintenance domains may nest or touch, but cannot intersect. If two domains nest, the outer domain must have a higher maintenance level than the one it engulfs. A maintenance domain is defined by provisioning which bridge ports are interior to the domain.

The concept of maintenance domains is important due to the different scopes of management that must be provided for different organizations. Often there are three different organizations involved in a Metro Ethernet service: customers, service providers, and operators. Customers purchase Ethernet service from service providers. Service providers may use their own networks, or the networks of other operators to provide connectivity for the requested service. Customers themselves may be service providers, for example, a customer may be an Internet service provider that sells Internet connectivity.

Nesting of maintenance domains is useful when considering the business model where the service provider contracts with one or more operators to provide the Ethernet service to a customer. Each operator would have its own maintenance domain, and, in addition, the service provider defines its own domain that is a superset of the operators' domains. Furthermore, the customer has its own end-to-end domain, which, in turn, is a superset of the service provider's domain. Maintenance levels of various nesting domains should be communicated between the involved administering organizations. One model would be where the service provider assigns maintenance levels to the operators.

Any port of a bridge can be configured as a maintenance point. A maintenance point may be classified as a maintenance endpoint, maintenance intermediate point, or transparent point for a maintenance level. Maintenance endpoints reside at the edge of a maintenance domain, whereas maintenance intermediate points are internal to the domain. Hence, an intermediate point will forward CFM packets (unless it is a loopback or Linktrace destined for that intermediate point), while endpoints do not forward CFM packets because they must keep them within the domain. The only exception to this is when an endpoint is also acting as an intermediate point for a higher-level domain, in which case it will forward CFM packets as long as they are part of the higher-level domain.

CFM messages are used across domains using CFM loopback or Linktrace to isolate faults. This allows, for example, each different organization (customer, service provider, and operator) the ability to isolate the fault within the organization's maintenance level, without the service provider having to share its network information to the customer, or the operator having to share its network information to the service provider.

One embodiment uses an Ethernet CFM area boundary translator to translate CFM messages which are not compatible within multiple CFM areas within a network, such as example network 100 illustrated in FIG. 1, to which we now turn. Shown in FIG. 1 are two CFM areas 110 and 130. CFM area-1 (110) includes multiple network devices and operates according to a first CFM version. CFM area-2 (130) includes multiple network devices and operates according to a second CFM version, which is at least partially incompatible with the first CFM version. For example, one CFM version might be a proprietary CFM implementation and one CFM version might be an implementation of a CFM standard, or they might be implementations of different versions of the CFM standard, etc.

Certain CFM operations are desired to operate across multiple CFM areas (110, 130), such as between CFM maintenance endpoint 111 in CFM area-1 (110) and CFM maintenance endpoint 131 in CFM area-1 (130). One embodiment uses a CFM area boundary translator 120 interposed between CFM areas 110 and 130, in order to translate incompatible CFM messages such that end-to-end CFM operations can be performed across multiple CFM areas. In one embodiment, this translation may include reformatting of messages. In one embodiment, this translation may include storing CFM state information for using in performing the translation of CFM messages. In one embodiment, this translation may include CFM area boundary translator 120 acting as a proxy for one of the CFM maintenance endpoints 111, 131, or for another network device. In other words, CFM area boundary translator may intercept certain messages (e.g., capturing them so they are not sent into the other CFM area), and then act as the originator of these messages to a CFM enabled device in a different CFM area, and then receive, translate, filter (e.g., selectively drop), and communicate the responses to the originating CFM network device.

One embodiment includes: a plurality of Ethernet network interfaces, including: a first network interface configured for communicating with a first Connectivity Fault Management (CFM) area including a first plurality of network devices, and a second network interface configured for communicating with a second CFM area including a second plurality of network devices; wherein the first CFM area is operating according to a CFM version not fully compatible with a CFM version according to which the second CFM area is operating; and a CFM translator configured to translate incompatible CFM messages communicated between the first and second CFM areas.

In one embodiment, said translating incompatible CFM messages includes acting as a proxy for performing operations received from the second CFM area. In one embodiment, said translating incompatible CFM messages includes acting as a proxy for performing CFM Linktrace operations received from the second CFM area. In one embodiment, said acting a proxy includes: intercepting a particular Linktrace Message (LTM) inbound to the first CFM area from the second CFM area; modifying the Original MAC Address field of the Linktrace Message Format of the LTM from a first MAC address to an address of the apparatus; sending said modified LTM into the first CFM area; receiving one or more particular replies to said sent modified LTM; and sending one or more reply messages into the second CFM area to the first MAC address based on said received one or more particular replies. In one embodiment, said intercepted particular LTM inbound to the first CFM area includes the use forwarding database only (UseFDBonly) option; and said sent modified LTM does not including the UseFDBonly option.

In one embodiment, the CFM translator is configured: to translate a proprietary version of CFM messages received from the first CFM area to a standard version of CFM messages, and to forward said standard version of CFM messages into the second CFM area. In one embodiment, the CFM translator is configured to add an identification of the CFM version of the first CFM area to one or more messages being sent from the first CFM area to the second CFM area to inform one or more devices in the second CFM area of said CFM version of the first CFM area. In one embodiment, said one or more messages are one or more CFM Continuity Check messages.

One embodiment includes operations performed by a Connectivity Fault Management (CFM) area boundary bridge, with these operations comprising: intercepting a particular Linktrace Message inbound to a first CFM area from a second CFM area, wherein the first CFM area is operating according to a CFM version not fully compatible with a CFM version according to which the second CFM area is operating; modifying the Original MAC Address field of the Linktrace Message Format of the LTM from a first MAC address to an address of the CFM area boundary bridge; sending said modified LTM into the first CFM area; receiving one or more particular Linktrace Reply messages to said sent modified LTM; and sending one or more Linktrace Reply messages into the second CFM area to the first MAC address based on said received one or more particular Linktrace Reply messages. In one embodiment, said intercepted particular LTM inbound to the first CFM area includes the use forwarding database only (UseFDBonly) option; and said sent modified LTM does not including the UseFDBonly option.

One embodiment includes a networked system, comprising: a first Connectivity Fault Management (CFM) area including a first plurality of network devices; a second Connectivity Fault Management (CFM) area including a second plurality of network devices; and a CFM area boundary bridge communicatively coupled to the first and second CFM areas; wherein a CFM maintenance domain spans the both the first and second CFM areas and the first CFM area operates according to a CFM version not fully compatible with a CFM version according to which the second CFM area operates; and wherein the CFM area boundary bridge is configured to translate incompatible CFM messages communicated between the first and second CFM areas.

In one embodiment, said translation of incompatible CFM messages includes acting as a proxy for performing one or more CFM operations received from the second CFM area. In one embodiment, said acting a proxy includes: intercepting a particular Linktrace Message inbound to a first CFM area from a second CFM area; modifying the Original MAC Address field of the Linktrace Message Format of the LTM from a first MAC address to an address of the CFM area boundary bridge; sending said modified LTM into the first CFM area; receiving one or more particular Linktrace Reply messages to said sent modified LTM; and sending one or more Linktrace Reply messages into the second CFM area to the first MAC address based on said received one or more particular Linktrace Reply messages. In one embodiment, said intercepted particular LTM inbound to the first CFM area includes the use forwarding database only (UseFDBonly) option; and said sent modified LTM does not including the UseFDBonly option. In one embodiment, the CFM translator is configured to translate a proprietary version of CFM messages received from the first CFM area to a standard version of CFM messages and to forward said standard version of CFM messages into the second CFM area.

One embodiment includes: a plurality of Ethernet network interfaces, including: a first network interface configured for communicating with a first Connectivity Fault Management (CFM) area including a first plurality of network devices, and a second network interface configured for communicating with a second CFM area including a second plurality of network devices; wherein the first CFM area is operating according to a CFM version not fully compatible with a CFM version according to which the second CFM area is operating; and a CFM translator configured to add an identification of the CFM version of the first CFM area to one or more CFM messages being sent from the first CFM area to the second CFM area to inform one or more devices in the second CFM area of said CFM version of the first CFM area. In one embodiment, the CFM translator is configured to act as a proxy for performing CFM Linktrace operations received from the second CFM area. In one embodiment, said acting a proxy includes: intercepting a particular Linktrace Message (LTM) inbound to the first CFM area from the second CFM area; modifying the Original MAC Address field of the Linktrace Message Format of the LTM from a first MAC address to an address of the apparatus; sending said modified LTM into the first CFM area; receiving one or more particular replies to said sent modified LTM; and sending one or more reply messages into the second CFM area to the first MAC address based on said received one or more particular replies.

One embodiment includes: means for intercepting a particular Linktrace Message inbound to a first CFM area from a second CFM area, wherein the first CFM area is operating according to a CFM version not fully compatible with a CFM version according to which the second CFM area is operating; means for modifying the Original MAC Address field of the Linktrace Message Format of the LTM from a first MAC address to an address of the CFM area boundary bridge; means for sending said modified LTM into the first CFM area; means for receiving one or more particular Linktrace Reply messages to said sent modified LTM; and means for sending one or more Linktrace Reply messages into the second CFM area to the first MAC address based on said received one or more particular Linktrace Reply messages. In one embodiment, said intercepted particular LTM inbound to the first CFM area includes the use forwarding database only (UseFDBonly) option; and said sent modified LTM does not including the UseFDBonly option.

Figure 2:
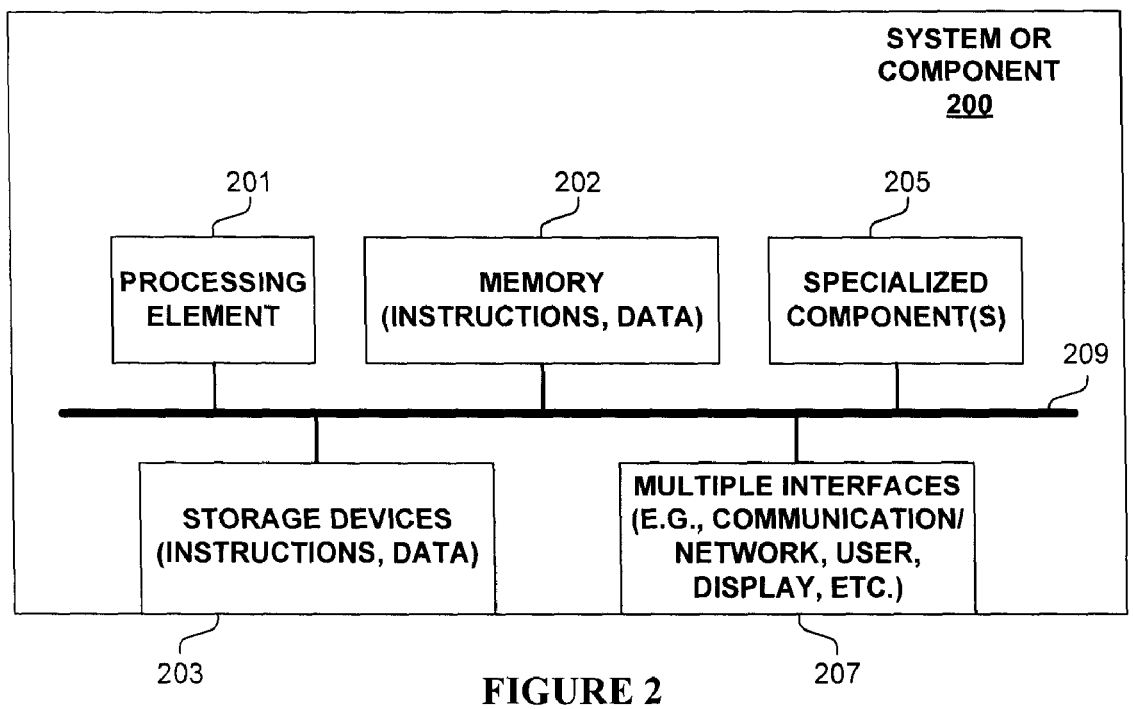
FIG. 2 illustrates an example system or component used in one embodiment.

FIG. 2 is block diagram of a system or component 200 used in one embodiment of a CFM area boundary translator for performing the translation of incompatible CFM messages between multiple CFM areas. In one embodiment, system or component 200 performs one or more processes corresponding to one of the flow diagrams illustrated or otherwise described herein.

In one embodiment, system or component 200 includes a processing element 201, memory 202, storage devices 203, specialized components 205 (e.g. optimized hardware such as for performing classification operations for identifying CFM messages, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application.

Various embodiments of component 200 may include more or less elements. The operation of component 200 is typically controlled by processing element 201 using memory 202 and storage devices 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with an embodiment. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with an embodiment.

Figure 3:
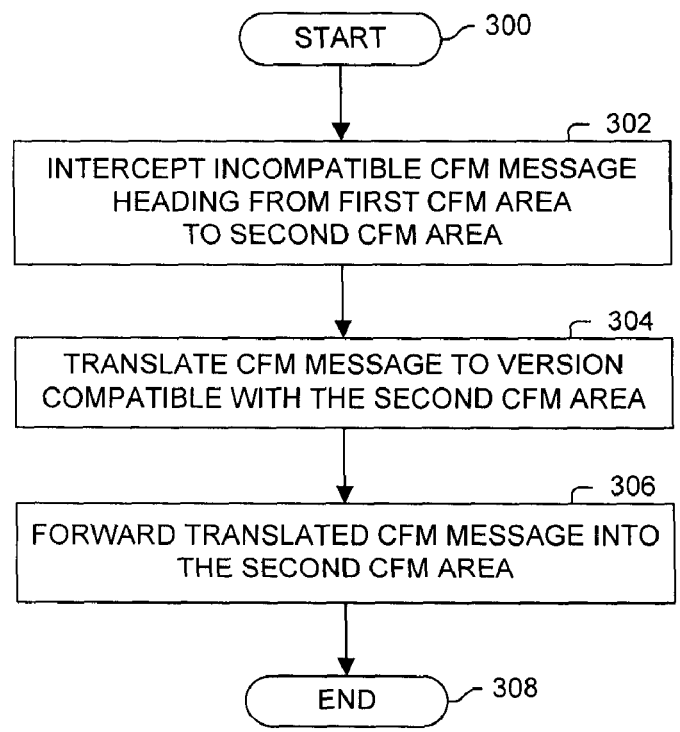
FIG. 3 illustrates a process performed in one embodiment.

FIG. 3 illustrates a process used in one embodiment of a CFM area boundary translator. Processing begins with process block 300. In process block 302, an incompatible CFM message heading from a first CFM area to a second CFM area is intercepted (e.g., received and not sent into the second CFM area). In process block 304, the CFM message is translated to a version compatible with the second CFM area. In process block 306, the translated CFM message is forwarded into the second CFM area. Processing of the flow diagram illustrated in FIG. 3 is complete as indicated by process block 308. Note, the process illustrated in FIG. 3 is used in one embodiment for translating CFM messages and CFM reply messages being sent between CFM areas.

Figure 4:
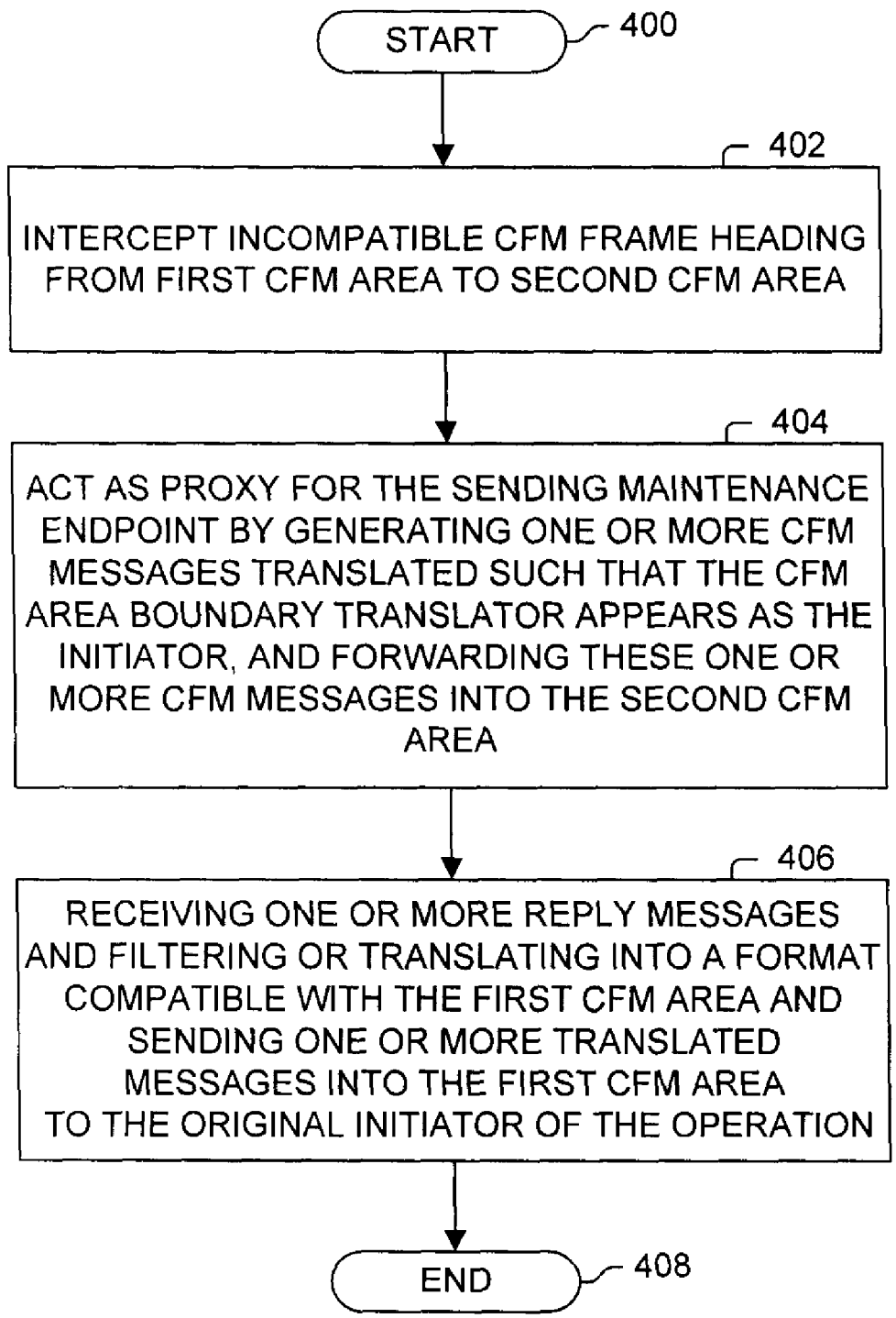
FIG. 4 illustrates a process performed in one embodiment.

FIG. 4 illustrates a process used in one embodiment of a CFM area boundary translator. Processing begins with process block 400. In process block 402, an incompatible CFM message being sent from a first CFM area to a second CFM area is intercepted (e.g., receiving and stopping the incompatible CFM message from being forwarded). In one embodiment, the CFM message is a Linktrace Message (LTM). In process block 404, the CFM area boundary translator acts as a proxy for the originating CFM device by creating and sending one or more CFM messages compatible with the second CFM area with the CFM area boundary translator acting as the originator of these CFM messages. In process block 406, one or more received responses are translated into a CFM version compatible with that of the originating CFM devices, and these replies are translated into reply messages as if they were direct responses to the original CFM messages, and are forwarded to the originating CFM device. Note, some of the received responses may be filtered (e.g., selectively dropped) depending on the nature of the reply. Processing of the flow diagram illustrated in FIG. 4 is complete as indicated by process block 408.

Figure 5:
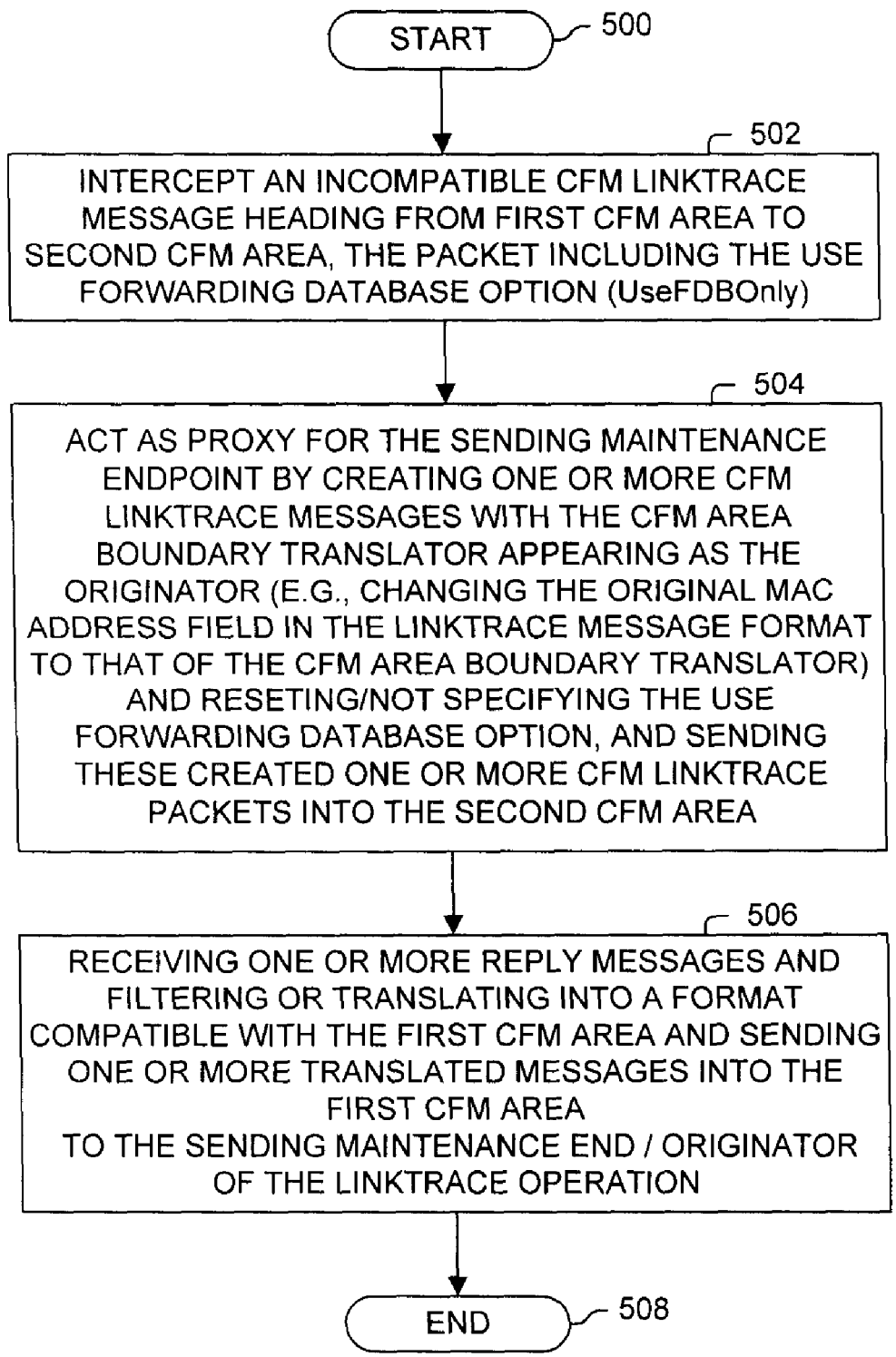
FIG. 5 illustrates a process performed in one embodiment.

FIG. 5 illustrates a process used in one embodiment of a CFM area boundary translator. This process is similar to that described in relation to FIG. 4, but the process of FIG. 5 illustrates that a CFM area boundary translator may change options of CFM messages in order to accomplish the desired goals of the original CFM messages. For example, one option of a CFM Linktrace message is to specify to use, or not to use, only the bridge forwarding database of the network device (e.g., via the UseFDBonly flag/option). If this option is set, then only the bridge forwarding database is referenced, and if consulted and a next hop is not found, then no reply is sent. However, if this forwarding database option is not set, upon not finding a next hop entry in the bridge forwarding database, the CFM Continuity Check Database (CCDB) is consulted, which may include the desired forwarding information. For example, certain networks/CFM areas may have MAC address learning disabled, and therefore, CFM messages (e.g., CFM Linktrace) will fail if the forwarding database only option is set. One embodiment of a CFM area boundary translator turns off the forwarding database option for its translated messages, such as that illustrated by the flow diagram of FIG. 5. Note, one embodiment performs the operations illustrated in FIG. 5 with the exception of modifying the UseFDBonly option.

Processing of the flow diagram of FIG. 5 begins with process block 500. In process block 502, an incompatible CFM message, having the forwarding database only option set, being sent from a first CFM area to a second CFM area is intercepted (e.g., receiving and the incompatible CFM message). In process block 504, the CFM area boundary translator acts as a proxy for the originating CFM device creating and sending one or more CFM messages, not having the forwarding database only option set, compatible with the second CFM area with the CFM area boundary translator acting as the originator of these CFM messages. In process block 506, one or more received responses are translated into a CFM version compatible with that of the originating CFM devices, and these replies are translated into reply messages as if they were direct responses to the original CFM messages, and are forwarded to the originating CFM device. Note, some of the received replies may be filtered (e.g., selectively dropped) depending on the nature of the reply. Processing of the flow diagram illustrated in FIG. 5 is complete as indicated by process block 508.

Figure 6:
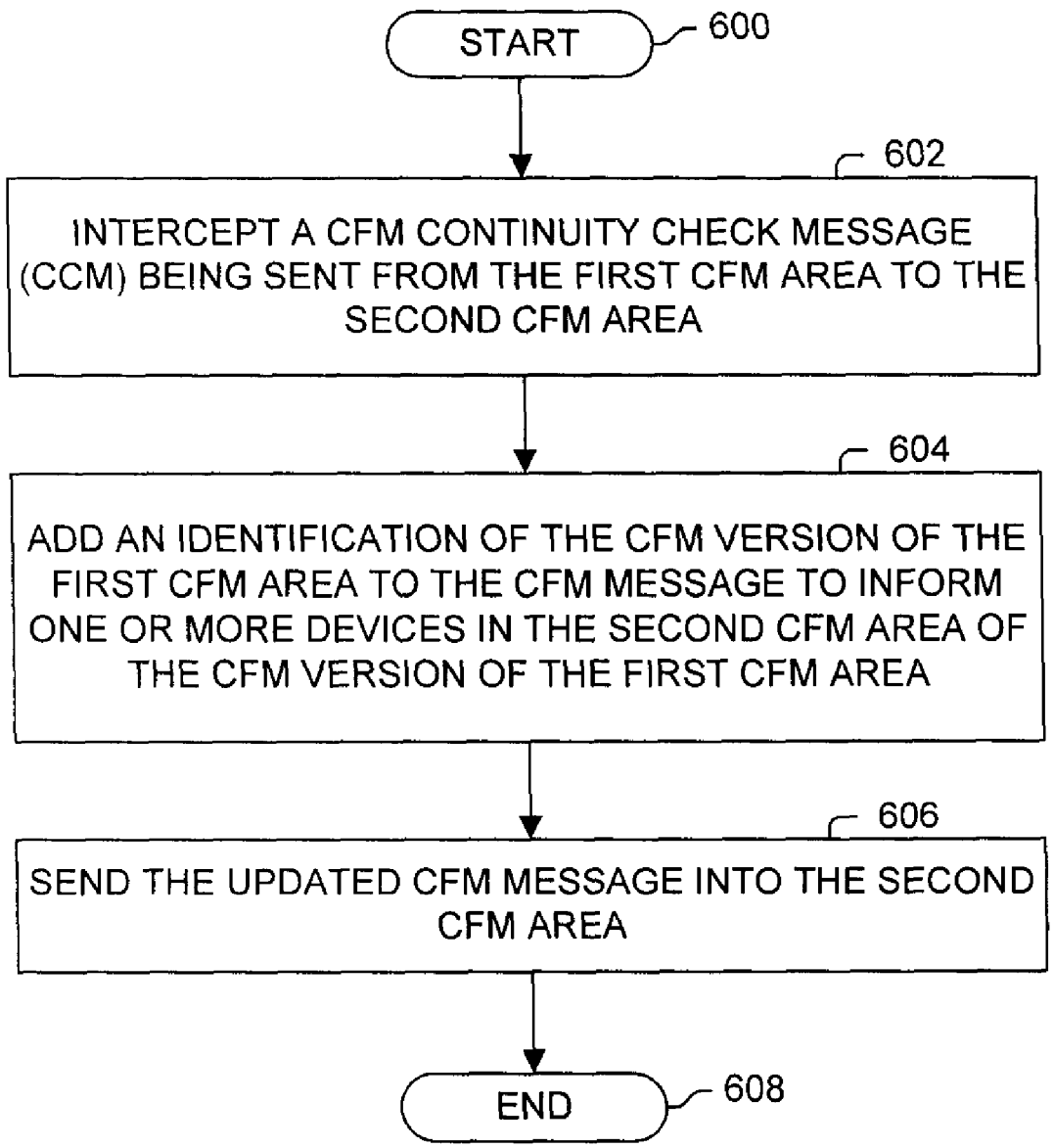
FIG. 6 illustrates a process performed in one embodiment.

FIG. 6 illustrates a process used in one embodiment that informs CFM devices in a second CFM area of the CFM version of a first CFM area by intercepting certain CFM messages, and adding this CFM version information to them. For example, in one embodiment, a CFM area boundary translator does not intercept CFM Loopback messages, and therefore cannot intercept and reformat them. By informing the CFM endpoints of the CFM version of different CFM areas, these endpoints can adjust their messages so that CFM devices in another area can understand them. In one embodiment, the CFM area boundary translator adds this version information to a CFM Continuity Check Message (CCM) being communicated from the first area to the second area.

Processing of the flow diagram of FIG. 6 begins with process block 600. In process block 602, a CFM Continuity Check Message (CCM) being sent from the first CFM area to the second CFM area is intercepted. In process block 604, an identification of the CFM version of the first CFM area is added to the intercepted message (e.g., in a tag, or Type, Length, Value (TLV) field) to inform one or more CFM devices in the second CFM area of the CFM version of the first CFM area. In process block 606, the updated CFM CCM is sent into the second CFM area. Processing of the flow diagram of FIG. 6 is complete as illustrated by process block 608.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
a plurality of Ethernet network interfaces, including: a first network interface configured for communicating with a first Connectivity Fault Management (CFM) area including a first plurality of network devices, and a second network interface configured for communicating with a second CFM area including a second plurality of network devices; wherein the first CFM area is operating according to a CFM version not fully compatible with a CFM version according to which the second CFM area is operating; and
a CFM translator configured to translate incompatible CFM messages communicated between the first and second CFM areas;
wherein the CFM translator is configured to add an identification of the CFM version of the first CFM area to one or more messages being sent from the first CFM area to the second CFM area to inform one or more devices in the second CFM area of said CFM version of the first CFM area.

2. The apparatus of claim 1, wherein said translating incompatible CFM messages includes acting as a proxy for performing operations received from the second CFM area.

3. The apparatus of claim 1, wherein said translating incompatible CFM messages includes acting as a proxy for performing CFM Linktrace operations received from the second CFM area.

4. The apparatus of claim 3, wherein said acting as a proxy includes: intercepting a particular Linktrace Message (LTM) inbound to the first CFM area from the second CFM area; modifying the Original MAC Address field of the Linktrace Message Format of the LTM from a first MAC address to an address of the apparatus; sending said modified LTM into the first CFM area; receiving one or more particular replies to said sent modified LTM; and sending one or more reply messages into the second CFM area to the first MAC address based on said received one or more particular replies.

5. The apparatus of claim 4, wherein said intercepted particular LTM inbound to the first CFM area includes the use forwarding database only (UseFDBonly) option; and said sent modified LTM does not including the UseFDBonly option.

6. The apparatus of claim 1, wherein the CFM translator is configured: to translate a proprietary version of CFM messages received from the first CFM area to a standard version of CFM messages, and to forward said standard version of CFM messages into the second CFM area.

7. The apparatus of claim 1, wherein said one or more messages are one or more CFM Continuity Check messages.

8. A method, comprising:
intercepting a particular Linktrace Message inbound to a first CFM area from a second CFM area, wherein the first CFM area is operating according to a CFM version not fully compatible with a CFM version according to which the second CFM area is operating;
modifying the Original MAC Address field of the Linktrace Message Format of the LTM from a first MAC address to an address of the CFM area boundary bridge;
sending said modified LTM into the first CFM area;
receiving one or more particular Linktrace Reply messages to said sent modified LTM; and
sending one or more Linktrace Reply messages into the second CFM area to the first MAC address based on said received one or more particular Linktrace Reply messages.

9. The method of claim 8, wherein said intercepted particular LTM inbound to the first CFM area includes the use forwarding database only (UseFDBonly) option; and said sent modified LTM does not including the UseFDBonly option.

10. A networked system, comprising:
a first Connectivity Fault Management (CFM) area including a first plurality of network devices;
a second Connectivity Fault Management (CFM) area including a second plurality of network devices; and
a CFM area boundary bridge communicatively coupled to the first and second CFM areas;
wherein a CFM maintenance domain spans the both the first and second CFM areas and the first CFM area operates according to a CFM version not fully compatible with a CFM version according to which the second CFM area operates; and
wherein the CFM area boundary bridge is configured to translate incompatible CFM messages communicated between the first and second CFM areas;
wherein said translation of incompatible CFM messages includes acting as a proxy for performing one or more CFM operations received from the second CFM area,
wherein said acting as a proxy includes: intercepting a particular Linktrace Message inbound to a first CFM area from a second CFM area; modifying the Original MAC Address field of the Linktrace Message Format of the LTM from a first MAC address to an address of the CFM area boundary bridge; sending said modified LTM into the first CFM area; receiving one or more particular Linktrace Reply messages to said sent modified LTM; and sending one or more Linktrace Reply messages into the second CFM area to the first MAC address based on said received one or more particular Linktrace Reply messages.

11. The networked system of claim 10, wherein said intercepted particular LTM inbound to the first CFM area includes the use forwarding database only (UseFDBonly) option; and said sent modified LTM does not including the UseFDBonly option.

12. The networked system of claim 10, wherein the CFM translator is configured to translate a proprietary version of CFM messages received from the first CFM area to a standard version of CFM messages and to forward said standard version of CFM messages into the second CFM area.

13. An apparatus, comprising
a plurality of Ethernet network interfaces, including: a first network interface configured for communicating with a first Connectivity Fault Management (CFM) area including a first plurality of network devices, and a second network interface configured for communicating with a second CFM area including a second plurality of network devices; wherein the first CFM area is operating according to a CFM version not fully compatible with a CFM version according to which the second CFM area is operating; and
a CFM translator configured to add an identification of the CFM version of the first CFM area to one or more CFM messages being sent from the first CFM area to the second (TM area to inform one or more devices in the second CFM area of said CFM version of the first CFM area.

14. The apparatus of claim 13, wherein the CFM translator is configured to act as a proxy for performing CFM Linktrace operations received from the second CFM area.

15. The apparatus of claim 14, wherein said acting as a proxy includes: intercepting a particular Linktrace Message (LTM) inbound to the first CFM area from the second CFM area; modifying the Original MAC Address field of the Linktrace Message Format of the LTM from a first MAC address to an address of the apparatus; sending said modified LTM into the first CFM area; receiving one or more particular replies to said sent modified LTM; and sending one or more reply messages into the second CFM area to the first MAC address based on said received one or more particular replies.

16. An apparatus, comprising:
means for intercepting a particular Linktrace Message inbound to a first CFM area from a second CFM area, wherein the first CFM area is operating according to a CFM version not fully compatible with a CFM version according to which the second CFM area is operating;
means for modifying the Original MAC Address field of the Linktrace Message Format of the LTM from a first MAC address to an address of the CFM area boundary bridge;
means for sending said modified LTM into the first CFM area;
means for receiving one or more particular Linktrace Reply messages to said sent modified LTM; and
means for sending one or more Linktrace Reply messages into the second CFM area to the first MAC address based on said received one or more particular Linktrace Reply messages;
wherein said intercepted particular LTM inbound to the first CFM area includes the use forwarding database only (UseFDBonly) option; and said sent modified LTM does not including the UseFDBonly option.

17. An apparatus, comprising:
a plurality of Ethernet network interfaces, including: a first network interface configured for communicating with a first Connectivity Fault Management (CFM) area including a first plurality of network devices, and a second network interface configured for communicating with a second CFM area including a second plurality of network devices; wherein the first CFM area is operating according to a CFM version not fully compatible with a CFM version according to which the second CFM area is operating; and
a CFM translator configured to translate incompatible CFM messages communicated between the first and second CFM areas;
wherein said translating incompatible CFM messages includes acting as a proxy for performing CFM Linktrace operations received from the second CFM area,
wherein said acting as a proxy includes: intercepting a particular Linktrace Message (LTM) inbound to the first CFM area from the second CFM area; modifying the Original MAC Address field of the Linktrace Message Format of the LTM from a first MAC address to an address of the apparatus; sending said modified LTM into the first CFM area; receiving one or more particular replies to said sent modified LTM; and sending one or more reply messages into the second CFM area to the first MAC address based on said received one or more particular replies.

18. The apparatus of claim 17, wherein said translating incompatible CFM messages includes acting as a proxy for performing operations received from the second CFM area.

19. The apparatus of claim 17, wherein said intercepted particular LTM inbound to the first CFM area includes the use forwarding database only (UseFDBonly) option; and said sent modified LTM does not including the UseFDBonly option.

20. The apparatus of claim 17, wherein the CFM translator is configured: to translate a proprietary version of CFM messages received from the first CFM area to a standard version of CFM messages, and to forward said standard version of CFM messages into the second CFM area.

* * * * *

UNITED STATES PATENT AND TRADEMARK OFFICE
CERTIFICATE OF CORRECTION

| | | |
|---|---|---|
| PATENT NO. | : 7,782,761 B2 | Page 1 of 1 |
| APPLICATION NO. | : 12/045563 | |
| DATED | : August 24, 2010 | |
| INVENTOR(S) | : Salam et al. | |

It is certified that error appears in the above-identified patent and that said Letters Patent is hereby corrected as shown below:

Col. 11, line 1, Claim 13, replace "(TM area" with -- CFM area --

Signed and Sealed this

Fifth Day of October, 2010

David J. Kappos
*Director of the United States Patent and Trademark Office*